United States Patent [19]
Veilleux

[11] 4,153,089
[45] May 8, 1979

[54] FLEXIBLE CONTAINER FOR STORING SAND

[76] Inventor: Roger L. Veilleux, 67 S. Whitney St., Hartford, Conn. 06106

[21] Appl. No.: 908,157

[22] Filed: May 22, 1978

[51] Int. Cl.$^2$ .................................. B65D 29/00
[52] U.S. Cl. ............................. 150/7; 150/1; 150/3; 150/12; 116/63 C; 222/462; 222/530
[58] Field of Search .............. 222/527, 528, 529, 530, 222/462; 150/7, 1, 3, 12; 116/63 P, 63 C

[56] References Cited

U.S. PATENT DOCUMENTS

| | | | |
|---|---|---|---|
| 187,561 | 2/1877 | Rightor | 222/530 |
| 1,262,634 | 4/1918 | Buxton | 150/7 |
| 2,078,497 | 4/1937 | Johnston | 222/462 X |
| 2,781,811 | 2/1957 | Dilar | 150/52 R |
| 2,808,803 | 10/1957 | Weig | 116/63 C |
| 3,707,320 | 12/1972 | Byrnes | 116/63 C |

FOREIGN PATENT DOCUMENTS 1543419  9/1968  France .................................. 116/63 P

*Primary Examiner*—Donald F. Norton

[57] ABSTRACT

A container for the storage of sand, the container being of the type which may be stored in a motor vehicle such as a car or truck and which may be used to deliver sand to the wheels of a car stuck in the mud or snow. The container comprises a circular bottom and an elongated frustoconical body portion extending from the circular bottom, the body portion defining a pouring spout for pouring sand stored in the container. Because the body portion is elongated, sand can be delivered in difficult to reach places such as underneath a car. The container is preferably made out of a flexible water repellant fabric which may be folded over and affixed in the folded position to close the container during non-use. The container may also include a reflector mounted thereon to allow the use of the container as an emergency road reflector.

13 Claims, 7 Drawing Figures

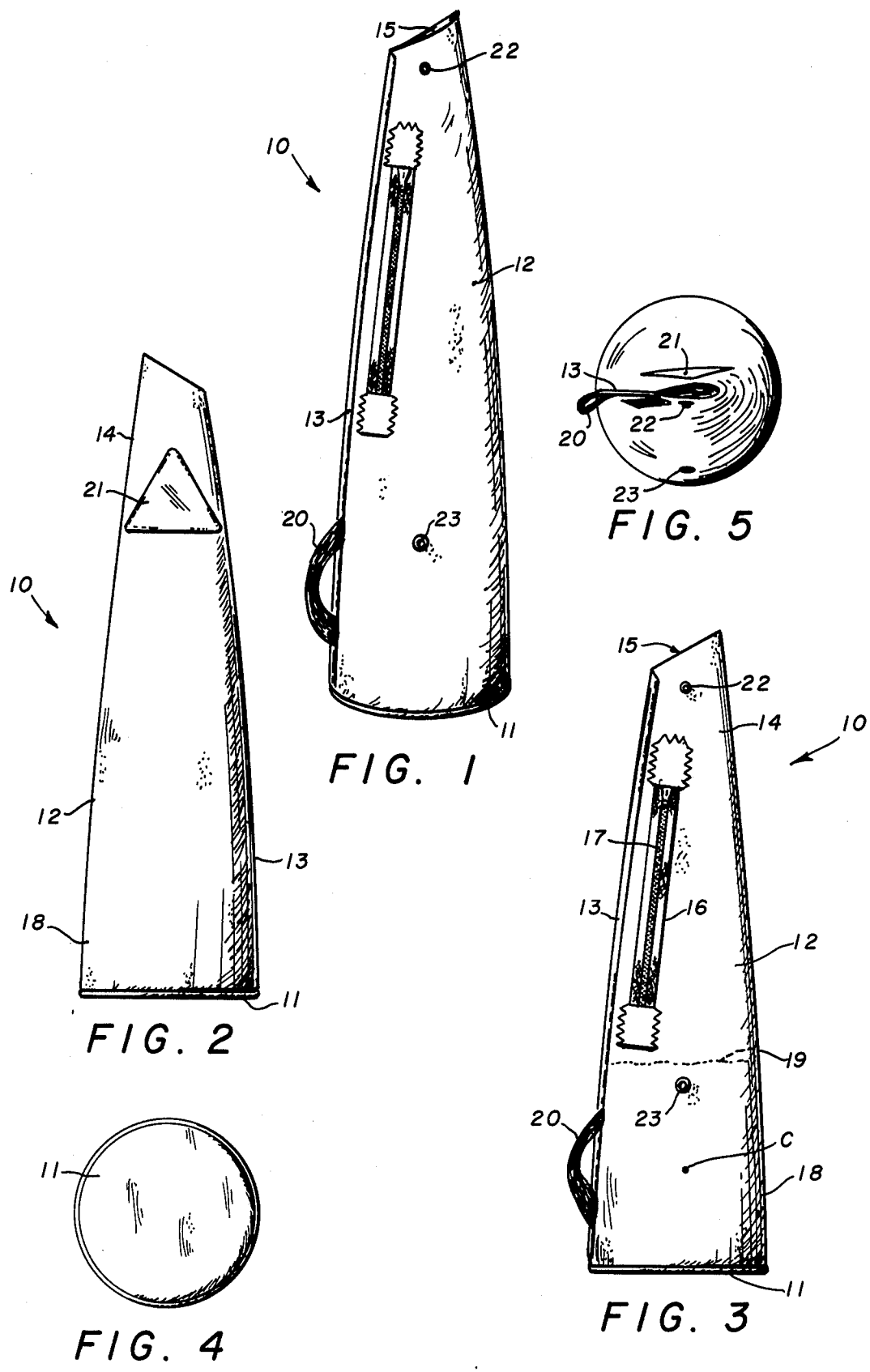

FLEXIBLE CONTAINER FOR STORING SAND

BACKGROUND OF THE INVENTION (1) Field of the Invention

The present invention relates to containers for storing sand, the containers being of the type which are stored in a motor vehicle such as a car or truck, the sand in the container being used to free the car if it should get stuck in mud or snow. The present invention also relates to emergency reflectors for use during highway emergencies.

(2) Description of the Prior Art

During the winter months, there exists a difficult problem that operators of motor vehicles such as cars or trucks have: because of the lack of friction of the drive wheels of a car in snow, in mud, or on ice, the cars may become immobilized. Many solutions to the age old problem have been proposed. One is to provide the tires of the car with studs or chains in an attempt to avoid the problem. However, it has been found that even with studs or chains on the tires, a motor vehicle may still get stuck. One solution to the problem of the cars getting stuck, is to apply sand or some other similar grannular material to the area of the mud, snow or ice near the drive wheels. This method has proved to be extremely successful.

However, until the present invention, no practical and convenient container has been provided which allows convenient storage and delivery of sand. Conventional wisdom teaches to buy a reinforced bag of sand or salt and keep the conventional bag in the trunk of the car in anticipation of future use. However, with a conventional bag of sand, the sand must be delivered to a spot underneath the car which is difficult to reach. Thus, in conjunction with carrying the bag of sand, the operator of the motor vehicle normally also carries a shovel for delivering the sand to an area near the drive wheels. During the course of the winter, moisture may enter the area in which the sand bag is stored and wet the paper sand bag. The wet bag is more difficult to handle and the sand in the bag may agglomerate thereby making it difficult to apply the sand.

Applying sand to the area near the wheels of an immobilized car is a particularly difficult task for the elderly and other persons having a lack of physical strength to shovel sand. Thus, it would be desirable to provide a container which allows for easy application of the sand to the area near the drive wheels of a car.

Moreover, once a conventional sand bag is opened, it is extremely difficult to close the sand bag in order to prevent the leakage of the sand into the trunk of the car. In general, sand bags are rectangular in shape and are difficult to store in the trunk of the car without the sand tending to spill over the floor of the trunk of the car. Thus, it would be desirable to provide a sand bag which may be maintained in the upright position to prevent tumbling of the container and spilling of the sand.

It is often desirable to carry an emergency reflector in the trunk of a car in order to allow positioning of the reflector on the roadside during a roadside emergency such as changing of a tire or the like. Thus, an operator of a motor vehicle not only carries a sand bag and a shovel, but also carries an emergency reflector.

It is one object of the present invention to provide a sandbag which allows for storage of the sand and which also allows for delivery of the sand to difficult to reach areas such as those near the drive wheels of a car stuck in snow, ice or mud.

It is another object of the present invention to provide a container for sand which may be refilled.

It is a further object of the present invention to provide a container which may be filled with sand and closed to prevent leakage of sand in the trunk of a car. It is also an object of the present invention to provide a container for sand which tends to remain in an upright position so that the sand within the container is not spilled into the trunk of a car.

It is a further object of the present invention to provide a container which may hold sand and which may also be used by elderly people or other persons having a lack of physical strength.

It is still another object of the present invention to provide a container for sand which may be used as an emergency roadside reflector.

SUMMARY OF THE INVENTION

The present invention provides a sand container of the type which may be stored in the trunk of a motor vehicle, the sand being used to free cars which may become stuck in the snow, ice or mud. The container comprises a circular bottom and a frustoconical body portion which extends from the circular bottom and which is generally elongated in shape. The end of the body portion terminates in a spout which allows for the pouring of sand or other granular material near the drive wheels of a car stuck in the snow, ice or mud. The container is preferably made of a flexible water impermeable material which is stiff enough to allow pouring of the sand but which is flexible enough to allow for folding of the upper portion of the frustoconical body portion so as to close the pouring spout. Because of its unique frustoconical shape, the container has a particularly low center of gravity, and thus, when filled with sand and placed in the trunk of a car, the container tends to maintain its upright position.

Also, along the exterior wall of the frustoconical body portion is positioned a handle which allows for use of the container by people having a lack of physical strength. Preferably the handle is positioned at a height measured from the bottom of the bag so as to be located close to the center of gravity of the container when the container is filled with sand. Thus, a person holding the handle with one hand can easily direct the location of the pouring spout so as to accurately place sand at the desired place near the drive wheels of a car. Also, because the container has an elongated shape, there is no requirement for carrying a shovel in the car in order to deliver the sand to difficult to reach places. With its elongated shape, the person applying the sand can stand in nearly an upright position and direct the sand by positioning the pouring spout in the desired areas.

Also, the container may include an access opening closable by a zipper to provide for convenient refilling of sand in the container. The container may also be provided with a means for securing the upper portion of the body to the lower portion of the body in order to close the pouring spout. Although it is preferred that snaps be used for this purpose, any conventional means of attachment such as buckles or the like may be used.

A light reflector may be positioned on the upper portion of the exterior of the frustoconical body in order to provide an emergency reflector for use in roadway emergencies. Moreover, the entire body of the container can be made of a bright and visible plastic material so as to provide for additional reflectivity.

To summarize, the present invention provides a container for sand which may be conveniently carried in a car without spillage of the sand and which provides for easy delivery of the sand in the container to areas near the drive wheels of a car.

BRIEF DESCRIPTION OF THE DRAWINGS

FIG. 1 is a front perspective view of the container;

FIG. 2 is a back plan view of the container shown in FIG. 1;

FIG. 3 is a front plan view of the container shown in FIG. 1;

FIG. 4 is a bottom plan view of the container shown in FIG. 1;

FIG. 5 is a top plan view of the container shown in FIG. 1;

DETAILED DESCRIPTION OF THE INVENTION

Figure 6:
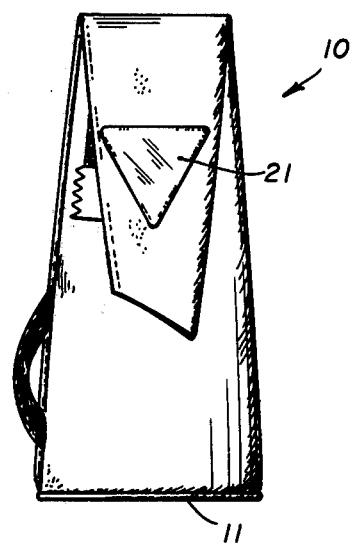
FIG. 6 is a front view of the container shown in FIG. 1 with the upper portion of the container bent over to close the container.

Referring to the FIGURES, the container for sand is shown generally at reference character 10. Container 10 includes a generally circular bottom 11 and a frustoconical body portion 12 which is sewn to bottom 11 and which extends upwardly therefrom. Body 12 has a generally elongated shape and is made from a swatch of flexible material sewn along seam 13. The upper portion 14 of body 12 defines a pouring chute which terminates in a sand pouring spout 15 through which sand may be distributed to the area adjacent drive wheels of a car stuck in the snow, ice or mud. The upper portion 14 of the body also includes an access opening 16 which is closeable by a zipper 17 and which allows for insertion of sand into container 10. Although it is preferred that a zipper be used, it should be understood that any conventional means of providing closeable access to the interior of container 10 may be used. For example, a velcro type closing may be used or the access slit may be laced together.

The container 10 also has a handle which is sewn into seam 13 near the bottom portion 18 of body 12. As shown best by FIG. 3, sand 19 may be loaded into container 10 up to a position just below zipper 17. Because of the generally conical shape of the container, the center of gravity C of the container when the bag is loaded is very close to the bottom of the container. The handle 20 is positioned on the exterior surface of the body 12 at a point corresponding generally to the center of gravity of container 10. When the container is filled with sand 19, operation of the container 12 by a person lacking physical strength is facilitated. The operator may engage handle 20 and direct the pouring spout 15 toward the area at which he desires to place sand. The container will pivot about the center of gravity C to allow for direction of pouring spout 15. Because of the unique conical shape, an integral pouring chute is provided along the internal wall of body 12. Thus, sand is delivered from the bottom of the bag where it is stored, along the interior wall of body 12 and out the sand pouring spout 15.

As best shown in FIGS. 2, 5 and 6, the exterior wall of the upper portion 14 of body 12 has affixed to it a reflector 21. The reflector can be of the flexible type which may be sewn onto the surface of container 10 or may be of the hard inflexible type which may be adhered to the surface of container 12 by an adhesive such as rubber cement. The reflector 10 has any shape which is capable of fitting on container 12.

Preferably, the material of container 10 comprises a water impermeable material so as to prevent the sand or other granular material stored within container 10 from agglomerating. Moreover, it is preferable that container be made from a material which is stiff enough to provide a container having an internal wall which functions as a pouring chute but which is also flexible enough to allow for the container to be bent at a portion intermediate the the bottom of the container and the pouring spout of the container to provide for closure of the container. Most preferably, the container is made from a plastic coated woven fabric. It has been found that a plastic coated fabric having a weight of between 15 and about 25 ounces per square yard is most suitable for use in the present invention. Because the material is plastic, the material tends to harden in cold temperatures such as those that are prevelent in the trunk of a car during the winter season. This provides for increased rigidity which allows for the interior wall of the container to function as a sand chute for delivering sand through pouring spout 15. However, the cold temperature should not affect the material so as to prevent the ability of the material to fold over so as to close the pouring spout. Most preferably, the material should be a nylon fabric coated with polyvinyl chloride. It has been found that this material is highly tear resistant and has superior abrasion resistance. The material may be purchased in very bright colors so that the container as a whole functions as a reflector.

Figure 7:
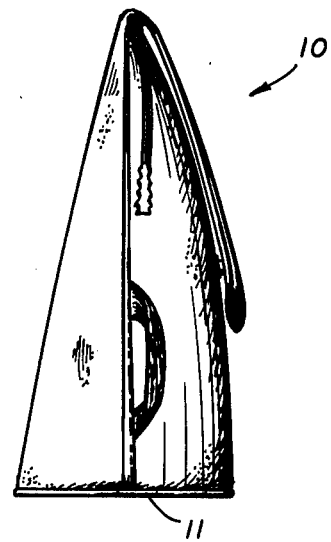
FIG. 7 is a side view of the container shown in FIG. 6

The manner in which container 10 may be closed is apparent from FIGS. 1, 3, 5, 6 and 7. The upper portion 14 of body 12 has affixed to it a male snap 22 which is adapted to engage female snap 23. Female snap 23 is located on the exterior sufface of the bottom 18 of body 12. The manner in which the bag is closed is best shown in FIGS. 6 and 7 wherein the bag is bent at a position intermediate the bottom portion and the pouring spout to allow for engagement of male snap 22 with female snap 23. Thus, the bag when filled with sand and closed has a relatively low center of gravity which provides for upright maintenance of the bag when stored in the trunk of a car.

While the present invention has been described with respect to containers for storing sand which may be used in connection with motor vehicles such as cars or trucks, it should be understood that the above described container can be used for storage of any type of material such as granular material or particulate material. For example, the bag may be used to store kitty litter or may be used for storing salt which may be later poured on the sidewalks or steps in front of a residence. The use of the bag of the present invention is only limited by the imagination of its user.

While preferred embodiments have been shown and described, various modifications and substitutions may be made thereto without departing from the spirit and scope of the inventon. Accordingly, it is to be understood that the present invention has been described by way of illustration and not limitation.

What is claimed is

1. A container of the type which may be used for storing sand and which may be stored in a motor vehicle and used to apply sand to an area near the drive wheels of the motor vehicle which is stuck in the snow, ice or mud, the container comprising:

(a) a generally circular bottom;
(b) an elongated frustoconically shaped body portion extending from said bottom and terminating in a pouring spout; and
(c) the body being made of a plastic coated fabric material having a weight between about 15 and 25 ounces per square yard and which is sufficiently stiff to allow the elongated body to function as a chute but being sufficiently flexible to allow the container to be folded over at a postion intermediate the bottom and the pouring spout to provide for closing of the pouring spout.

2. A container according to claim 1 and further including a handle attached to the bottom portion of the elongated body such that the handle is located at approximately the center of gravity of the container when the container is filled with sand.

3. A container according to claim 1 and further including closable access means which allows for the insertion of sand into the interior of the container.

4. A container according to claim 3 wherein said closable access means comprises a zipper.

5. A container according to claim 1 wherein the upper portion of the container has attached thereto a reflector.

6. A container according to claim 5 and further including means for holding the container in the folded position.

7. A container according to claim 6 wherein said means for holding includes a snap affixed to the top portion of the body and a snap affixed to the bottom portion of the body, the two snaps being engageable with one another.

8. A container comprising:

(a) a generally circular bottom;
(b) an elongated frustoconically shaped body portion extending from said bottom and terminating in a pouring spout;
(c) the body being made of a material which is sufficiently stiff to allow the elongated body to function as a chute but being sufficiently flexible to allow the container to be folded over at a position intermediate the bottom and the pouring spout to provide for closing of the pouring spout; and
(d) means for holding the container in the folded position.

9. A container according to claim 8 and further including a handle attached to the bottom portion of the elongated body such that the handle is located at approximately the center of gravity of the container when the container is filled with sand.

10. A container according to claim 8 and further including closable access means which allows for the insertion of sand into the interior of the container.

11. A container according to claim 10 wherein said closable access means comprises a zipper.

12. A container according to claim 8 wherein the upper portion of the container has attached thereto a reflector.

13. A container according to claim 8 wherein said means for holding includes a snap affixed to the top portion of the body and a snap affixed to the bottom portion of the body, the two snaps being engageable with one another.

* * * * *